United States Patent [19]
Slemp

[11] 3,824,538
[45] July 16, 1974

[54] MOTOR VEHICLE OPERATOR MONITORING SYSTEM
[75] Inventor: Cecil Slemp, Jarrettsville, Md.
[73] Assignee: Shelcy Mullins, Wise, Va. ; a part interest
[22] Filed: June 8, 1973
[21] Appl. No.: 368,229

[52] U.S. Cl.................... 340/53, 340/279, 180/99
[51] Int. Cl. .......................................... G08b 21/00
[58] Field of Search............ 340/52 R, 53, 237, 279; 180/99

[56] References Cited
UNITED STATES PATENTS
3,186,508   6/1965   Lamont.......................... 340/279 X
3,780,311   12/1973   Brown............................ 340/53 UX Primary Examiner—Alvin H. Waring
Attorney, Agent, or Firm—John F. McClellan, Sr.

[57] ABSTRACT

A motor vehicle operator monitoring system having control interlocks to disable an operated vehicle in graduated stages when the vehicle operator is found to have impaired faculties, including a system insuring that the operator periodically submits to testing on penalty of vehicle disablement, a system assessing test results, a system responsive to unsatisfactory test results to warn the vehicle operator, the public, and to bring the vehicle to a safe gradual stop taking terrain into account.

26 Claims, 20 Drawing Figures

PATENTED JUL 16 1974 3,824,538

| FIRST ENTERING VEHICLE | BELL 40 (ON) | COMBINATION LIGHT 28 (ON) | BREATH SAMPLE LIGHT 30 (ON) | CHEMICAL EXPIRED LIGHT 36 (ON) | PARK LIGHT 34 (ON) | DRIVE LIGHT 32 (ON) | DISABLER RELAY 22 (POINTS CLOSED) | METER VALVE 24 (CLOSED) | VEHICLE BRAKE LIGHT 29 (ON) | VEHICLE HEAD LIGHTS 46 (ON) | VEHICLE HORN 44 (ON) | ATTITUDE SWITCH 20 (ON) | TOTAL CUT OFF |
|---|---|---|---|---|---|---|---|---|---|---|---|---|---|
| 1- TURN ON MANUAL SW. 27 | ✓ | ✓ | ✓ |  | ✓ |  |  | ✓ |  |  |  |  |  |
| 2- GIVE COMBINATION |  |  |  |  |  |  |  |  |  |  |  |  |  |
| A- NO COMBINATION GIVEN | ✓ | ✓ | ✓ |  | ✓ |  |  | ✓ |  |  |  |  |  |
| B- WRONG COMBINATION | ✓ | ✓ | ✓ |  | ✓ |  |  | ✓ |  |  |  |  |  |
| C- RIGHT COMBINATION | ✓ |  | ✓ |  | ✓ |  |  | ✓ |  |  |  |  |  |
| 3- GIVE BREATH SAMPLE |  |  |  |  |  |  |  |  |  |  |  |  |  |
| A- ANY TYPE GIVEN |  |  |  |  | ✓ |  |  | ✓ |  |  |  |  |  |
| B- NO SAMPLE GIVEN | ✓ |  | ✓ |  | ✓ |  |  | ✓ |  |  |  |  |  |
| 4- BREATH SAMPLE RESULTS |  |  |  |  |  |  |  |  |  |  |  |  |  |
| A- DRUNK SAMPLE | ✓ |  | ✓ | ✓ | ✓ |  |  | ✓ |  | ✓ | ✓ |  |  |
| B- CUMULATIVE SAMPLE | ✓ |  | ✓ | ✓ | ✓ |  |  | ✓ |  | ✓ | ✓ |  |  |
| C- SOBER SAMPLE |  |  |  |  |  | ✓ | ✓ |  |  |  |  |  |  |
| HIGHWAY TRIP |  |  |  |  |  |  |  |  |  |  |  |  |  |
| 5- FIRST 59 MINUTES |  |  |  |  |  | ✓ | ✓ |  |  |  |  |  |  |
| 6- END OF THE 59 MINUTES | ✓ |  | ✓ |  |  | ✓ | ✓ |  |  |  |  |  |  |
| 7- ONE MIN. PERIOD BEGINS FOR MEETING DEMANDS BREATH SAMPLE NEEDED |  |  |  |  |  |  |  |  |  |  |  |  |  |
| A- NO SAMPLE GIVEN | ✓ |  | ✓ |  | ✓ |  |  | ✓ | ✓ | ✓ |  | ✓ | ✓ |
| 8- BREATH SAMPLE GIVEN RESULTS- |  |  |  |  |  |  |  |  |  |  |  |  |  |
| A- DRUNK SAMPLE | ✓ |  | ✓ | ✓ | ✓ |  |  | ✓ | ✓ | ✓ | ✓ | ✓ | ✓ |
| B- CUMULATIVE SAMPLE | ✓ |  | ✓ | ✓ | ✓ |  |  | ✓ | ✓ | ✓ | ✓ | ✓ | ✓ |
| C- SOBER SAMPLE |  |  |  |  |  | ✓ | ✓ |  |  |  |  |  |  |

ATTITUDE SWITCH 20 (ON): ELEVATED / TERRAIN
TOTAL CUT OFF: DELAYED 3 MINUTES IF

MOTOR VEHICLE OPERATOR MONITORING SYSTEM

This invention relates generally to control systems and specifically to motor vehicle operator monitoring systems.

Objects of the present invention are to provide a:

device to take drunken or otherwise mentally impaired or defective persons off the highways;

device as stated which periodically tests operators and which disables vehicles when the drivers are in unsafe mental states;

device as stated which operates in predetermined stages of reducing performance when disabling vehicle to avoid causing emergencies which might result in harm to the public or to the operator or passengers or property.

Brief summary of the invention in representative embodiment would include means for periodically testing the coordination and for analysing the breath content of vehicle operators, means for progressively disabling vehicles on nonreceipt of test results or on receipt of below standard test results, and means for warning the test subject and others affected.

In the prior art, devices for the purposes set forth have largely consisted in single devices of the classes of muscle tension testers, breath analysers, mental puzzles and the like and have operated usually without safety time delay reduction of vehicle performance by stages, without adequate warning, and in total disregard of terrain over which the vehicle may be passing, in contrast with the advantageous provisions of the present invention.

The above and other objects and advantages of this invention will become more readily apparent on examination of the following description, including the drawings in which:

FIG. 10a is a perspective in partial section of an assembly;

FIG. 10d is a sectional detail of a gear shown in FIG. 10a;

FIG. 10e is a detail in partial section of a gear mounting shown in FIG. 10a;

FIG. 11a is a side elevation of a switch assembly;

FIG. 11b is a detail in partial section of FIG. 11a;

FIG. 12 is a side elevation in partial section of a vehicle ignition coil; and

FIG. 13 is a side elevation in partial section of a vehicle valve.

Figures 1, 5A:
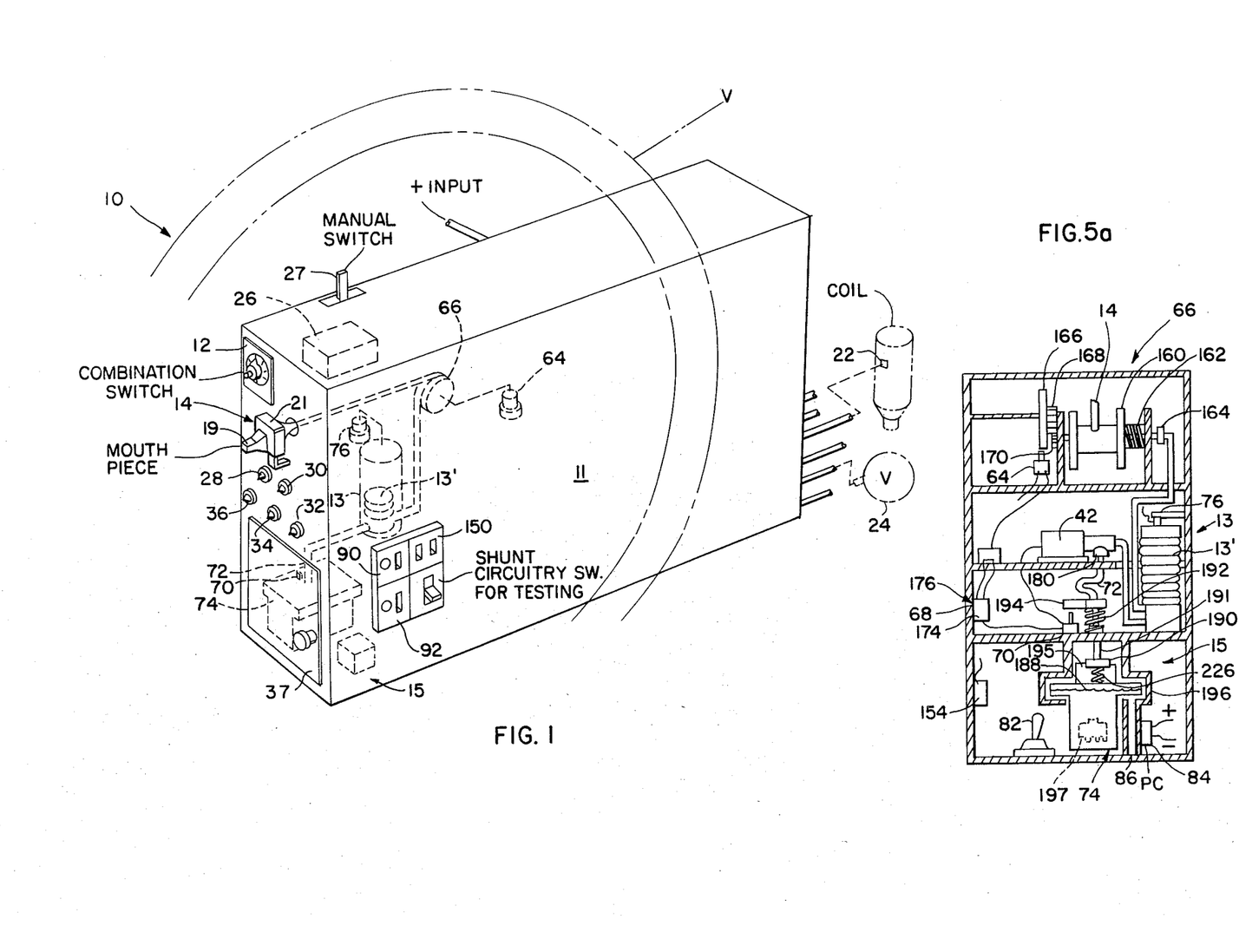
FIG. 1 is a perspective simplified diagrammatical view of the invention installed in a vehicle.
FIG. 5a is an end elevation in partial section of an assembly.

FIG. 1 shows the invention 10 installed in a motor vehicle V, ready to permit or to deny operation of the vehicle, depending on the physical and mental conditions of the operator.

The system deals with three principal cases:

1. When an operator is sober when he attempts to start the vehicle;
2. When the operator is drunk when he attempts to start the vehicle;
3. When the operator becomes drunk after starting the vehicle.

In order to deal successfully with these three conditions the system requires the operator on entering the vehicle to:

a. give the correct combination on a combination switch before he can start the vehicle, b. give a breath sample, if he passes the combination test, before he can start the vehicle, c. give successive breath samples every 60 minutes thereafter on penalty of having the vehicle rendered inoperative if he fails to do so or fails to pass the tests.

Having successfully started the vehicle, if the operator fails to pass one of the successively demanded breath sample tests during operation, the vehicle is disabled by degrees in successive timed stages, with appropriate warning, and is finally brought to a complete non-functional, stopped state. The time involved in reaching the stopped state can depend in part on the terrain over which the vehicle is passing, according to the input to an attitude sensor in the system.

The invention 10 is primarily contained in case 11, the only other parts not being conventional automobile equipment are represented at 22, special relay in automobile ignition coil, and 24, special metering valve in the automobile fuel system.

Figures 2, 5B, 5C:
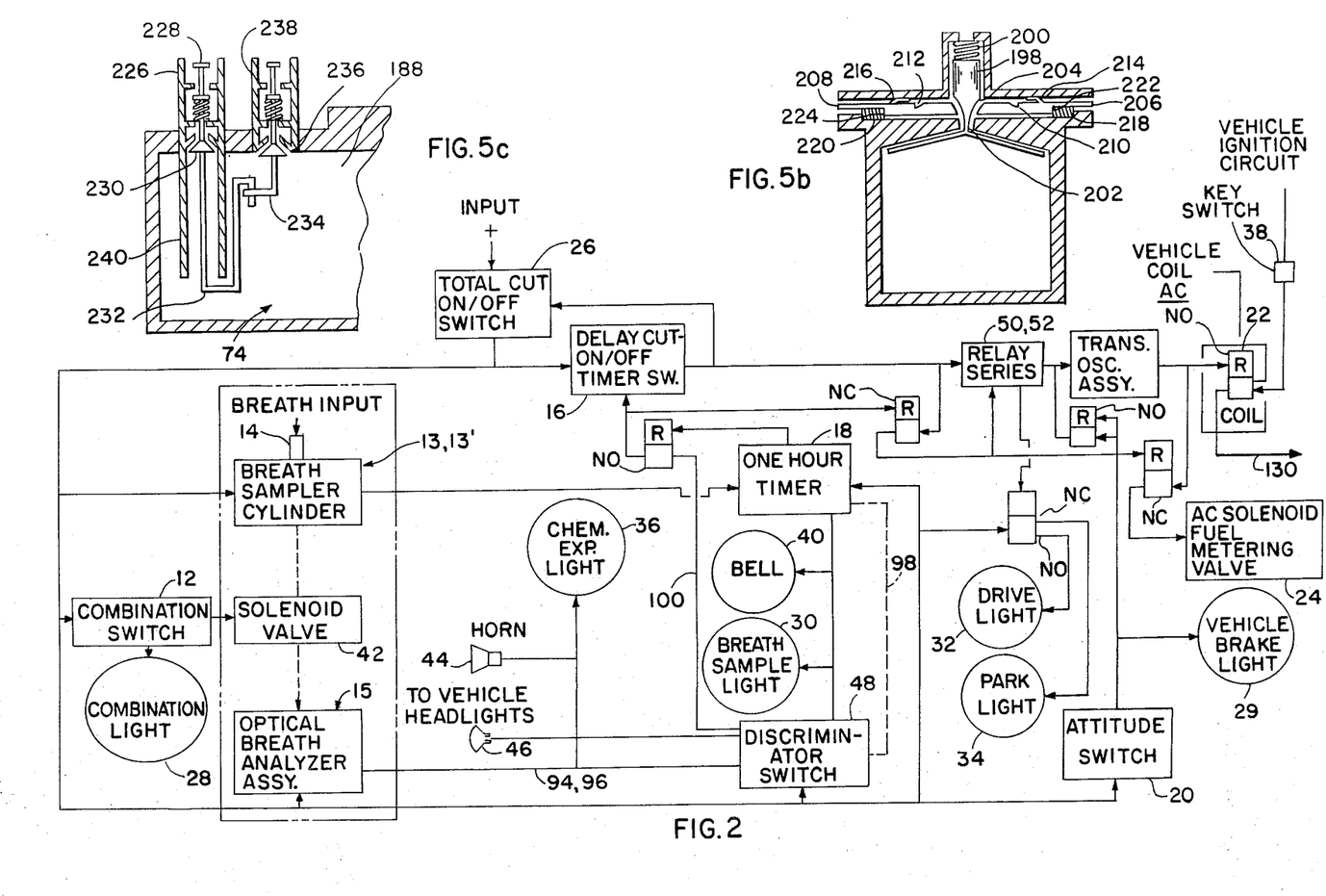
FIG. 2 is a simplified block diagram of the system with notations of operating sequence.
FIG. 5b and 5c are details of portions of FIG. 5a in section.

FIG. 1 mentioned above and FIG. 2 indicate the inputs to the system 10:

1. Manual manipulation of a combination switch 12;

2. Breath samples, given at 14 and passed for analysis at 15;

3. Time, according to timers 16, 18, 20, internal to the system, as shown in FIG. 2;

4. Attitude of vehicle with respect to gravity, as determined by gravity sensitive device and timer 20, internal to the system as shown in FIG. 2.

Test responsive vehicle disabling outputs of the system are:

a. control of electrical supply to vehicle coil, indicated at 22;

b. control of flow of fuel to vehicle engine, indicated at 24;

c. alternate control of (a) and (b) above if vehicle is going downhill at time operator fails to give sample or to pass test, by the gravity sensitive device 20 mentioned above;

d. control of electrical supply to entire testing system as through switch 26, internal to the system.

Test responsive warning outputs of the system are:

a. warning signal 28 indicating that combination is needed;

b. warning signal 30 indicating that breath sample is needed;

c. go-ahead signal 32 indicating tests passed and vehicle ready to start;

d. warning signal 34 indicating that operator has failed breath sample test;

e. warning signal 36 indicating that the test chemicals in the breath analyser have expired.

Major elements in the system therefore consist of combination or "puzzle" switch 12 controlling electrical input to the system, breath sample analysing system 13, 14, 15, a timing system 16, 18, 20 (FIG. 2) to provide time for analysis and for delayed cut-off of the vehicle, when needed, safely preventing emergencies; "downhill" sensing system 20 (the "downhill" switch has a timer associated with it) to prevent loss of power-assisted brakes and steering, as, for example, if the operator should put the vehicle in neutral, going downhill when the system would otherwise be disabled by reason of operator's failure to test or to pass test, and audible and visible signal system 28, 30, 32, 34, 36 to warn the operator, his passengers, and the public, as previously indicated.

Referring particularly to FIG. 1, a typical trip in brief outline is as follows:

1. Operator enters the automobile V, FIG. 1, turns on his ignition key (not shown) and manual switch 27;

2. OPerator manually enters a predetermined number-combination or letter-combination or a mixture of both in combination switch 12 in response to a visual signal 28 asking for same; if operator fails the combination test on entering the vehicle, he cannot advance to the breath test and cannot start the vehicle;

3. Operator reels out an armored tube 14 and blows through it by way of pipe-stem mouthpiece 19 and check valve 21 giving a breath sample through a reel assembly 66, tube 72 and bellows 13' located in cylinder 13 to chemical container 74 in response to a visual signal 30 which asks for same after the proper combination is entered; if operator fails the breath test he cannot start the vehicle.

4. If operator is sober by test, this is indicated by a visual signal 32 that the vehicle is ready for operation and he drives away;

5. After a predetermined time lapse, such as almost one hour of driving, operator gives another breath sample on demand of timed audible and visual signals represented by 30 and continues to do so each successive hour of operation and to drive unimpeded so long as he remains sober; if operator becomes intoxicated during the trip and fails a breath test, he gets audible and visual warnings represented by 34, 36 and 40 that the vehicle is going to stop, the vehicle horn will blow, the vehicle headlights and brakelights will come on, the fuel supply of the vehicle will meter down to idling where it will continue for so long as the vehicle may be going downhill but will cut off after three minutes if the vehicle is in any other attitude. In order for the operator to restart the vehicle he must replenish the chemicals (door 37) and re-pass the combination and the breath tests. FIG. 1 shows provision to testing in form of panel.

Figure 3:
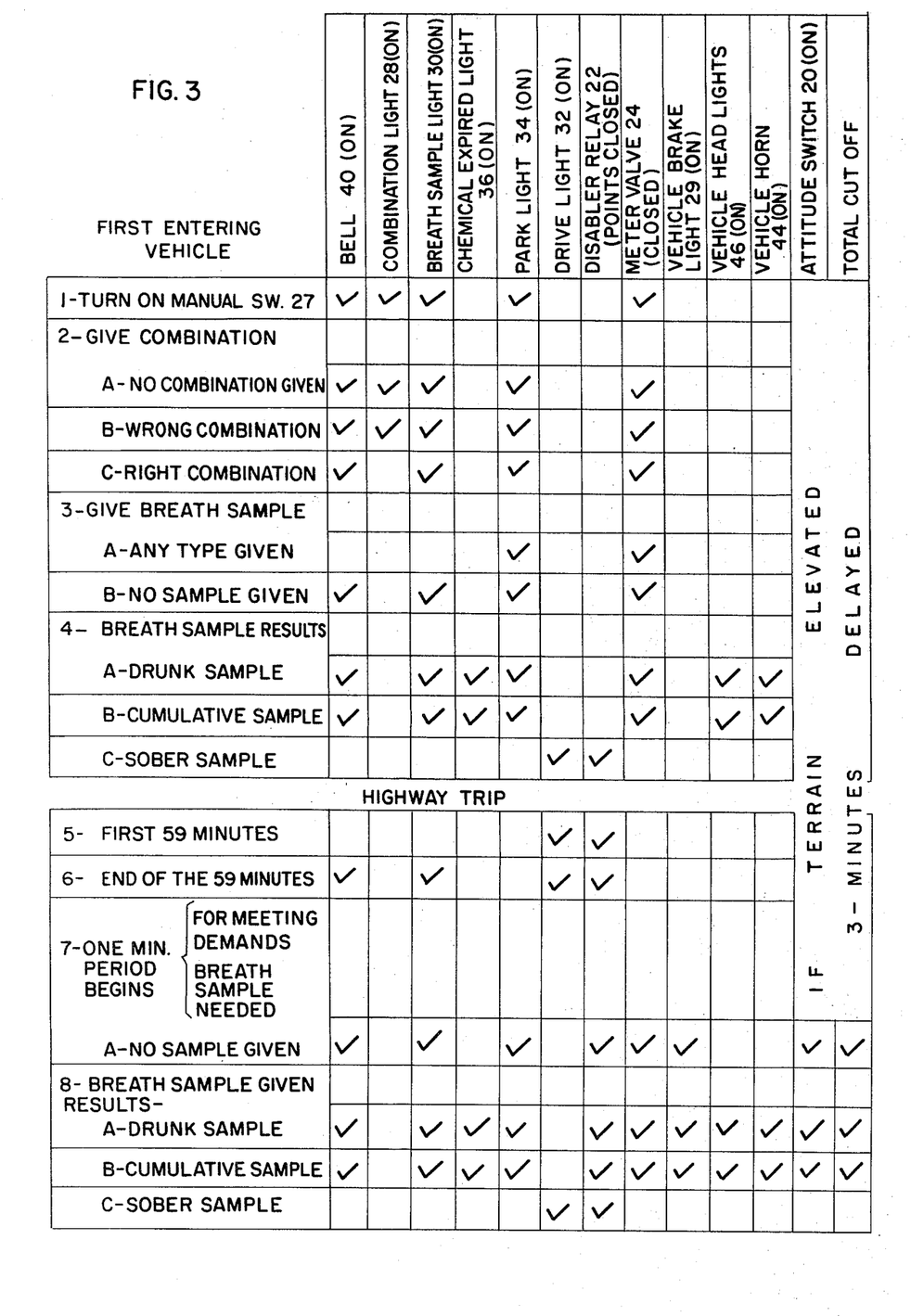
FIG. 3 is a table summarizing system outputs.

FIGS. 2 and 3 should be considered together.

FIG. 2 shows in outline form the features and interactive circuits making possible the above described vehicle-monitoring testing.

FIG. 3 summarizes the system outputs at each stage of operation.

As noted, there are two system electrical inputs, 26 and 38, which can be combined but are shown separately in FIG. 2. This is the preferred arrangement for reasons noted below.

The first control is the vehicle ignition switch 38 which operates in the normal manner.

The second control is the system on/system off switch 27. This is normally a manual "on" and a manual "off". Alternatively, if the operator forgets to turn the system off, timer 18 within the system will turn the system off at switch 26 within a maximum of slightly more than one hour after the operator gives a breath sample, if he is not operating the vehicle, saving the battery.

SYSTEM DEMANDS WHEN OPERATOR ENTERS AUTOMOBILE

When the operator enters the vehicle, he cannot start it without passing the tests imposed by the monitoring system because the vehicle is disabled by the monitoring system. The system keeps coil circuit 130 open and gasoline metering valve 24 closed until the designed series of tests is passed.

When the system switch is turned on, it supplies current to the entire system and thus arms the system, initiating the responses indicated in FIG. 3 on line 1. Bell 40, FIG. 2, rings demanding that the operator give a combination on combination switch 12 and a breath sample at breath input 14 of breath sample cylinder 13. Combination needed light 28 and breath sample needed light 30 simultaneously come on explaining the demand of the bell. Together with these signals, park light 34 comes on and stays on as long as one or more of these demands are not met.

Special relay 22 keeps the coil circuit of the automobile open and solenoid metering valve 24 in the fuel supply meters the supply to an idling level so long as the above test demands are not met by the operator.

OPERATOR RESPONSE TO SYSTEM-DEMANDS BEFORE STARTING AUTOMOBILE

As indicated on lines 2A and 2B of FIG. 3, if the operator fails to respond to the demands for combination, or gives a wrong combination, the system demands remain in effect and giving a breath sample will be ineffectual.

Giving the right combination allows solenoid valve 42 to be armed and turns off combination light 28, indicating satisfaction of that demand FIG. 3, 2c.

After the operator gives the right combination, the next step is for him to pull out or unreel an armored hose 14 into which he must blow. A switch 64, FIG. 1, responsive to the hose unreeling, closes solenoid valve 42, defining a predetermined volume of breath sample. Operator blows into a bellows 13', which is the primary capacity of the fixed volume. A switch 76, FIG. 1, which is struck by the expanded bellows, disables the system until the vellows relaxes as it expels the breath sample into the optical analyser assembly 15. (When the automobile is already in operation, as will be seen, this disablement is preceded by a 3-minute safety delay). As noted at FIG. 3, line 3A, the giving of any type sample (alcoholic or not) will turn off bell 40 and breath sample light 30. After the breath sample is given, the hose is released to re-reel, admitting the breath sample to the optical analyser assembly 15, starting a one-hour timer which will indicate when the next sample is needed, and starting a 15-second delay timer giving the system time to analyse the breath sample.

If no breath sample is given the bell 40 continues to ring and breath sample light 30 and park light 34 remain on as indicated in FIG. 3 at line 3B.

RESULTS OF ANALYSIS BY BREATH SAMPLE ANALYSER PREPARATORY TO VEHICLE START

As indicated in FIG. 3 at 4A, if the operator, before the vehicle can be started, gives an alcoholic breath sample, the system will remain disabled, bell 40 will ring, park light 34 will remain on, breath sample light 30 will come on again, the vehicle horn 44 will sound, the vehicle headlights 46 will be turned on, and chemicals expired light 36 will come on. The chemicals expired light indicates that the breath sample alcohol has exhausted the capacity of the chemicals to analyse so that replenishment is needed.

The level of intoxication indication/chemical exhaustion is set by a standard charge of known strength chemicals, which will be described later. This charge can be exhausted cumulatively by repeated small doses of alcohol in a number of breath samples, or by one breath sample at the level of intoxication. FIG. 3, line 4B, shows the cumulative results of samples in excess of chemical capacity.

If a non-alcoholic breath sample is given, park light 34 will go out, drive light 32 will come on after 15 seconds indicating that the operator can start the vehicle, the vehicle coil circuit will be energized, and the fuel supply metering valve will open fully. FIG. 3, line 4C, shows the results.

It is assumed that 10 seconds will be required for the chemicals to analyse the breath sample. This allows the analysis to take place 5 seconds before the vehicle can be started.

All the above actions resulting from the optical analysis of alcoholic content of the breath, are effectuated through discrimination of voltage outputs from a photocell, not shown, in the optical breath analyser 14, 15. The voltage discrimination is done by discriminator switch 48, which in turn controls the audible and visual signals and the previously mentioned auto disabling sub-system consisting of the coil-circuit disabler 22 and the gasoline metering-down 24 valve.

The remaining major elements shown in FIG. 2, the onehour timer 18 and the attitude switch 20 will be described in reference to the following description of period tests demanded during operation of vehicle.

PERIODIC TESTS DEMANDED DURING OPERATION OF VEHICLE

When the operator successfully passes the mental and physical tests required in order to start the vehicle, he then starts his vehicle in the ordinary manner and drives away.

He can drive continuously or can start and stop the vehicle and/or the engine of the vehicle as many times as he finds useful during the next 59 minutes (see FIG. 3, line 5) at the end of which time he is required to give a breath sample (FIG. 3, line 6).

One-hour timer 18 which is started counting by unit 14, 15, when the first breath sample is given, and which resets each time a breath sample is given, enforces the giving of the breath samples.

Bell 40 rings at the end of each 59 minutes, 1 minute before valve 24 is closed. The breath sample light will come on. During operation of the vehicle, if the operator fails to give a breath sample within 1 minute of demand (FIG. 3, line 7A) the bell will remain on, the park light will come on, and the one-hour timer will expire.

Expiration of 59 minutes on the one-hour timer 18 starts a 1-minute cycle within it; on lapse of the 1 minute without the necessary breath sample being given, the one-hour timer causes closure of fuel metering valve 24. Closing fuel metering valve 24 throttles the vehicle engine to a near idle, permitting the vehicle to be moved off the highway and preserving operation of power brakes and steering.

Simultaneously with closure of the metering valve 24 the one-hour timer starts a 3-minute cycle in the delayed cut on/cut off timer switch 16 and interrupts the circuit to the coil of the disabler relay 22 at relay series 50, 52 for the purpose of causing drive light 32 to go out, park light 34 to come on at the proper time. The reverse action by the drive light 32 and the park light 34 is also accomplished through the relay series 50, 52. However, the circuit to the coil of the disabler relay 22 continues to be energized through a bypass line (discussed later) by the delayed cut on/cut off timer switch 16 during the 3-minute delayed cut off cycle. At the end of the 3-minute cycle the contacts in the delayed cut on/cut off timer switch 16 open, de-energizing the coil of the disabler relay 22 and causing the contacts to open thus interrupting the vehicle ignition, causing the vehicle to stop. Because the fuel has been metered to an idle rate for 3 minutes at this time, presumably the vehicle will be travelling at a very low rate of speed or will be stopped, but giving a breath sample of any nature before cut off will interrupt the process of cut off.

If the breath sample is alcoholic, the operator simply buys an additional 10 seconds, namely the time required for a breath analysis and report by the system (see FIG. 3, line 8A). To restart the vehicle, the operator must replenish the chemicals, which expire each time an alcoholic sample is given, and then re-pass the combination and breath sample tests.

If the breath sample is non-alcoholic, the system is fully restored to operation and no further demand is made until the end of the next 59 minute period. (See FIG. 3, line 8C)

If the chemicals in the optical breath-analyser expire during operation of the vehicle, as from repeated low-alcohol breath samples, it will then be necessary for the operator to replenish the chemicals. (See FIG. 3, line 8B)

ADDITIONAL SAFETY BY-PASS TO PREVENT LOSS OF POWER BRAKES AND POWER STEERING ON INCLINE

FIG. 2 also shows a feature designed to prevent loss of power for brakes (and steering) when the vehicle is travelling downhill and the system would otherwise cut off. Attitude switch 20 senses the level of the vehicle and by-passes delay cut on/cut off timer 16 so long as the vehicle is on a downgrade, suspending the operation of the impairing system until it can be safely imposed.

Figure 4:
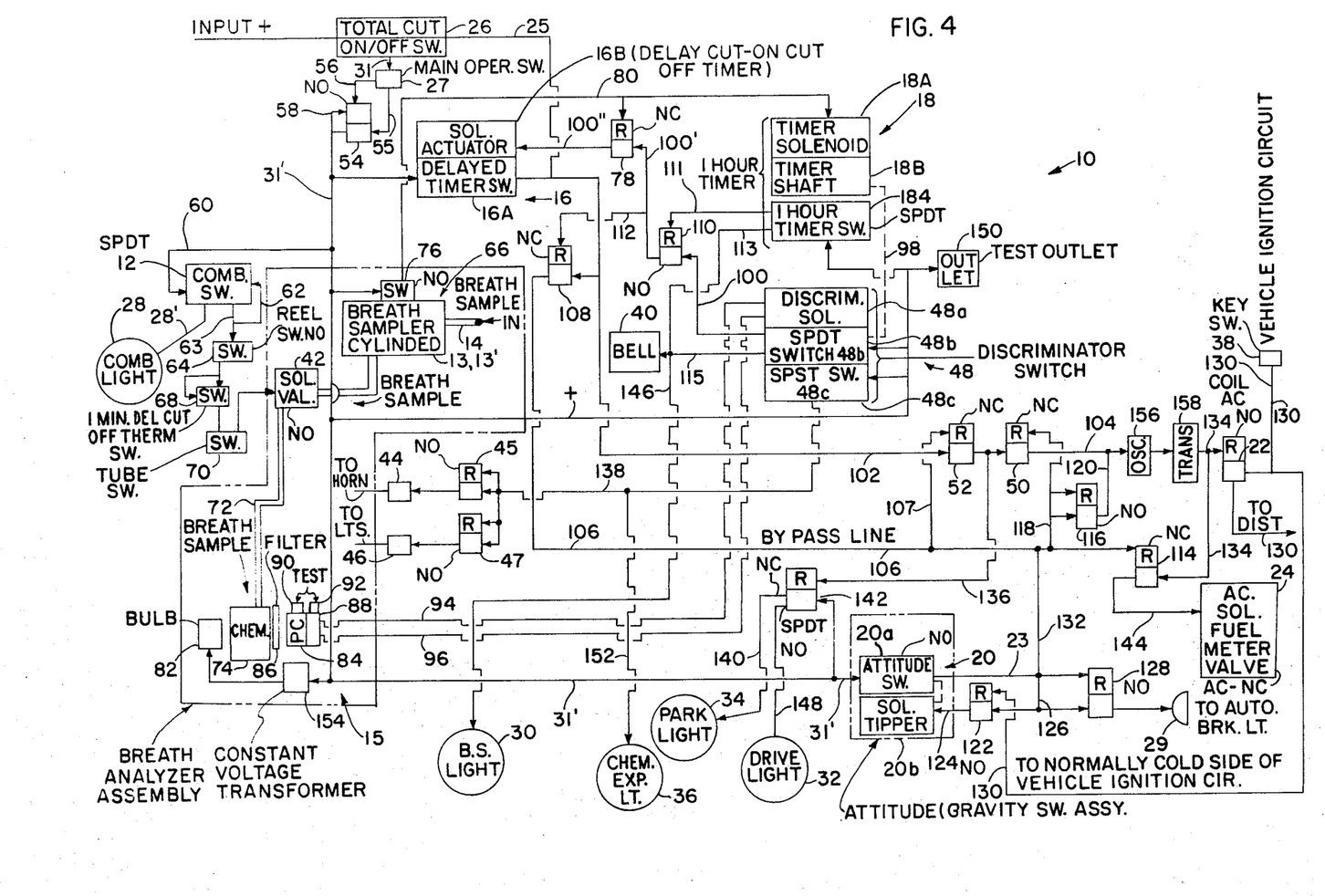
FIG. 4 is a detailed block diagram similar to FIG. 2.

FIG. 4 shows the circuitry of the system in more detail, so that anyone skilled in the art can build and operate the system.

Current passing through the system switches 26, 27 when manually turned on, energized SPDT relay 54 through line 56 and the relay locks itself in through line 58, relay 54.

Combination switch 12 is then energized through line 60. This switch is SPDT with a locking coil circuit 62 which holds the switch closed when depressed manually after proper combination is set into it. Combination needed light 28 is de-energized at this point.

Proper operation of the combination switch arms reel switch 64 so that when the hose 14 is pulled from the reel mechanism (66 in FIG. 1) reel switch 64 sends current through a one-minute delay switch (preferably a thermal switch) 68 to tube switch 70.

The purpose of this subcircuit is to insure that the breath conductive tube is connected to the chemical container 74, FIG. 1.

If tube 72 is not connected, the breath test cannot be successful and the vehicle cannot be operated. If the tube 72 is properly connected, the lip of the tube presses on the tube switch 70 and keeps it properly closed, closing a solenoid valve 42 in the breath path from the hose 14 to the chemical tank 74.

Closure of solenoid valve 42 allows the breath sample to inflate a bellows 13' (FIG. 1) actuating the bellows switch 76, setting the one-hour timer 18 which in turn imposes a 15 second delay in case the subject is drunk on operation of discriminator switch 48 through a mechanism to be described later to provide time for analysis of the breath test before discrimination of the result.

Actuation of the bellows switch also opens the points of interlocking relay 78 through line 80, preventing the coil of the automobile from being operable before the breath sample is analysed and also prevents the cut on/cut off delayed timer switch 16a from going to an "on" position at the time the breath sample is put into the chemicals.

Re-reeling the hose releases reel switch 64 allowing the solenoid valve 42 to open, releasing the breath sample in predetermined volume to pass into the chemical tank 74 of the optical breath analyser assembly 14, 15.

The previously mentioned one-minute delay switch 68 functions to prevent the user from deceiving the system by holding hose 14 in the out position, then releasing it only enough to permit a partial sample to reach the chemical tank 74 and pulling the hose out again. The delay switch will open the solenoid valve 42; allow the full breath sample to reach the chemical tank 74.

Chemical tank 74 has a transparent optical path through it, with a light source 82 on the one side and a photocell 84 on the other side, arranged in conjunction with a blue filter 86 if necessary, to measure the optical density of the chemical solution in the tank.

A preferred composition for the chemical solution and treatment is given in U.S. Pat. No. 2,824,789 to Robert F. Borkenstein, issued Feb. 25, 1958, and is generally as follows: a solution of 3 milliliters of 0.025 percent potassium dichromate in 50% by volume of concentrated sulphuric acid. The dichromate of this solution will oxidize 0.187 mg. of ethyl alcohol. If desired the further developments disclosed by Robert F. Borkenstein in his U.S. Pat. No. 3,553,920 issued Jan. 5, 1971, may be taken advantage of by those skilled in the art, as may the disclosure in U.S. Pat. No. 3,522,009 issued July 28, 1970 to Robert F. Borkenstein.

The optical breath analyser assembly also includes amplifier 88 to boost the output signal and test outlets 90 and 92 ahead of and behind the amplifier. Both test outlets preferably have integral shunt circuitry, not shown, which isolates the output and directs it exclusively to test equipment which is plugged into the test outlets.

The boosted output from the optical breath analyser passes through lines 94 and 96 to the coil 48a of the discriminator switch 48. As described earlier the discriminator switch is purposely delayed 10 seconds in operation due to time required for breath analysis before indication of the result in case the subject is drunk. This is accomplished through a mechanical linkage 98 as will be described later.

Depending on the voltage, the discriminator switch either indicates to the rest of the system that the driver is drunk or that he is sober.

When attempting to start the vehicle if the determination is "drunk" the discriminator switch 48 actuates bell 40 and interrupts current through line 100, the contacts of N.O. relay 110 through line 100', the contacts of N. C. relay 78, and line 100'', to the solenoid tipper 16b which mechanically co-acts with the delayed cut on/cut off timer switch 16a. In turn, the solenoid tipper 16b tips the delayed cut on/cut off timer switch 16a to the "off" position, preventing the contacts from closing. This prevents current from passing through line 102 to the coil of the N. O. disabler relay 22 located in the vehicle ignition coil and also prevents current from reaching the N. C. metering valve 24. As a result, the points of the N. O. disabler relay 22 remain open and the N. C. metering valve 24 remains closed, thus preventing starting the vehicle. A S. P. D. T. relay 142, the contacts of which are continuously energized through line 31', energizes the drive light 32 and park light 34 through lines 140 and 148, at the proper time. Line 136 through line 102 energizes coil relay 142 when line 102 is armed, thereby energizing drive light 32 through line 148. When relay 142 is not energized by line 136 park light 34 is energized through line 140. In addition the discriminator switch 48 sends current from switch 48c through line 138 to the coil and points of N. O. relays 45 and 47, closing the contacts and energizing the vehicle horn 44 and head lights 46. Also through line 138, 152 the chemical-expired light 36 is energized indicating to the operator that fresh chemicals are needed. Simultaneously with the discrimiantion by the discriminator switch 48, the bell 40 is again energized through line 115 and the breath sample light 30 is again energized through lines 115 and 146. The bell 40 and breath sample light 30 are always energized when the operator turns the system on, but any breath sample will de-energize both however if the subject is drunk and they will again be energized 10 seconds later.

If the vehicle is in operation at the time of the "drunk" determination at the beginning of the 3-minute critical period the fuel metering valve 24 closes 3 minutes before ignition cut off to slow the vehicle before shutting it off. This 3-minute delay is accomplished in the delayed cut on/cut off timer switch 16. The discriminator switch 48 through lines 100, 100' and 100'' and through the points of relays 78 and 110 de-energizes the solenoid tipper 16b which moves the delayed cut on/cut off switch 16A to the "off" position. Simultaneously N. C. relay 108 is de-energized through line 112 causing the contacts to close, allowing current from line 102 to pass to by-pass line 106 and to the coil of N. C. relay 114. Opening the contacts of relay 114 breaks the circuit through line 144 to the N. C. metering valve 24 causing it to close. At the same time through line 118 N. O. relay 116 is energized, closing the contacts and sending current through line 120 back to line, 104 and to the coil of the N. O. disabler relay 22, thus keeping the contacts closed for an additional 3-minutes until the delayed cut on/cut off timer switch 16 breaks the circuit. Simultaneously, on the closing of metering valve 24 through line 118 and line 107 N. C. relays 50 and 52 are energized, opening their contacts, causing the drive light 32 to go out and the park light 34 to come on. In addition, line 115 is energized causing bell 40 to ring and through line 146 the breath sample light 30 is energized. Through line 138 N. O. relay 45 and 47 are energized closing the contacts and energizing the vehicle horn 44 and the vehicle headlights 46. Through line 152 the chemical expired light 36 is energized by switch 48c. During the 3-minute interval current is maintaind in the vehicle ignition circuit allowing the vehicle to operate while the metering valve 24 is slowing the vehicle. Current through line 126, the contacts of relay N.O. 122 and line 124 is also fed to the down-hill or attitude switch solenoid tipper 20b making it possible for the attitude switch 20 to supply current to the system at any time during the 3-minute interval if the vehicle is travelling down grade.

Attitude switch 20 is, as noted, gravity sensitive and will, through line 23 by-pass line 106 relay 116 and lines 118, 120 supply current to the coil of relay 22 which allows the engine to run, preserving power steering and power brake capacities while travelling downhill. Line 126 through N.O. relay 128 parallels line 106 in supplying current to the brake light 29 in this or any attitude to warn following drivers of the impending stop. Line 107 connects line 106 with the coil circuit of relay 52.

To prevent the driver from parking in a downhill position during the 3-minute critical period and subsequently starting the car again without going through the procedure, N.O. relay 122 is caused to drop out through line 130 which is de-energized when the vehicle ignition is turned off. Dropping out of relay 122 breaks line 124, rendering the by-pass circuit 106,132 to the downhill switch inoperative. This prevents the driver from restarting after parking downhill in the 3-minute critical period, as noted.

Only during the 3-minute critical period by-pass line 106 energizes N. C. relay 114, breaking line 134 to the metering valve, closing the valve to an idling position.

The discriminator switch 48 at the beginning of the 3-minute period, through line 138 and line 152 causes the chemicals-expired light 36 to come on, the horn 44 to blow and the headlight 46 to come on, and each to be caused by its respective contact-coil circuit 45, 47. Through line 102 from the delayed cut on/cut off switch 16, line 136, relay 142 and through line 140, the discriminator switch also causes the park light 34 to come on.

In parallel opposed with the park light 34 is circuit 148 which includes drive light 32, so that when one of the lights is "on", the other is "off". At this point it should be noted that current to the delayed cut on/cut off switch 16 can also be interrupted by one-hour timer 18 when the time interval expires without re-qualifying action by the driver, resulting in exactly the same current interruption through the same circuitry as just described, and through line 146 causing breath-sample-needed light to come on.

When attempting to start the vehicle, if the determination of the discriminator switch 48 is "sober" it sends current through line 100, the contacts of relay 110, line 100', the contacts of relay 78 and line 100'' to the solenoid tipper 16 b. In turn, the solenoid tipper 16b allows the delayed cut on/cut off timer switch 16A to move into the "on" position, resulting in a 15-second delayed supplying of current through line 102, 104 and 134 to the coil of N. O. disabler relay 22 closing the contacts and completing the vehicle ignition circuit 130. Simultaneously, through line 134, the contacts of N. C. relay 114, and through line 144, current is sent to the N. C. metering valve 24 thus fully opening the valve and allowing the vehicle to be started. With the "sober" determination by the discriminator switch 48 the bell 40 and breath sample light 30 (lines 115 and 146) remain de-energized and the park light 34 (line 140 is de-energized, but through line 148 the drive light 32 is energized.

Oscillator 156 and transformer 158 supply a unique "non-standard" AC voltage to the ignition coil to prevent actuation of the coil by a jumper, avoiding the testing circuitry. The metering valve is also made to operate on the same circuit for the same reason, through line 134.

Test outlet 150 is a convenience outlet to supply a photometric tester, when used. Constant voltage transformer 154 prevents fluctuations in brightness of bulb 82 of the breath analyser 15.

The above described major elements and subsystems will now be described in detail, as follows:

a. the breath sample analyser;
b. the discriminator switch and the one-hour timer;
c. the delayed cut on/cut off switch;
d. the manual and total cut on/cut off switches;
e. the combination switch
f. the attitude switch and coil circuit disabler relay system, and
g. the fuel metering valve.

A. THE BREATH SAMPLE ANALYSER (FLUID SECTION OF DEVICE)

FIG. 5a is an end elevation showing mechanical and electrical elements of the breath sample analyser.

Breath is blown by the subject into the system through input tube 14 and travels through spool 160 of reel mechanism 66, which serves to store the input tube 14 when re-reeled under torque of spring 162 and through rotative coupling 164 into a measuring volume. Unreeling the spool 160 as shown, sets up an electrical circuit determining the volume of the breath sample accepted by causing cam 166 geared down in connection with the spool by gears 168 and 170, to actuate reel switch 64. This, in turn, through the contact section 174 of normally closed thermal delay switch 176 and normally open tube switch 70 closes solenoid valve 42 closing the vent 180 of breath sample cylinder 13 and bellows 13'.

Breath sample cylinder 13 contains a bellows 13' which, when inflated, strikes bellows switch 76 limiting the volume mechanically, and arming one-hour timer 18 for a purpose which will be seen. Bell 40, which has to this point been ringing, is disconnected by S. P. D. T. switch 184 is a part of the one-hour timer and which likewise controls the breath sample light.

When the subject user finds the volume limited, he releases the input tube 14, which re-reels releasing switch 64, and opening the bellows vent 180 through solenoid valve 42. This passes the breath sample into chemical container 74, ready for analysis. If the subject user fails to unreel, time delay switch element 68 opens the contact section 174, achieving the same end.

Analysis consists in a light transmission test through a fluid 188 which decreases in optical density with increasing alcoholic content. One example of this principal is specifically set out in U.S. Pat. No. 2,824,789, issued Feb. 25, 1958 to R. F. Borkenstein.

In the present arrangement, container 74 is transparent in the light path between photocell 84 and light source 82. The light source is kept at constant brightness by constant-voltage transformer 154. A colored filter 86 may be used to obtain better measurement.

Any change in the optical density of the fluid 188 affects correspondingly the voltage output of photocell 84. Before discussing analysis of the voltage output, other features of this unit should be mentioned.

To prevent operation of the device in the absence of the chemical container, a Schrader clamp attachment 190 is supplied at the top of the container. Drop-tube 191 leading to the Schrader valve is rigid metal which close-fits the frame of the invention and cannot be bent or pulled aside. Block 195 in the center of the container prevents drop-tube 191 from dropping unless in place. When the container 74 is fully inserted, thermostatic constant temperature circuit 197 is plugged in through prongs extending from the container, and maintains a year-round 45°C temperature. Spring 192 acting on foot 194 forces the foot up when clamp attachment 190 is released, opening the points of switch 70, which are otherwise kept closed by the foot pressure, opening solenoid valve 42, releasing pressure in bellows 13', and deactivating the analysis system as will be seen.

FIG. 5b is a section in elevation showing means of preventing the user from tampering with a fresh container. Container 74 is supplied slightly pressurized and fits tightly in track 196, FIG. 5a, when inserted. Reduction of pressure, as by tampering, allows spring loaded plunger 198, 200, which is normally sealed in upward direction by pressure on the lower portion 202, to fall. The tapered part 204 of the plunger ejects hardened pins 206 and 208 which lock respective notches 210 and 212 in the pins at springs 214 and 216 fixed to the case, making insertion of the container into the track 196 impossible.

Coil springs 218 and 220, resting on the case, respectively urge the pins back by bearing on recesses 222 and 224 at the ends of the pins.

FIG. 5c shows provision for injection of breath into the chemical container. When the Schrader type coupling 190 (FIG. 5a) screws onto the inlet 226 (FIG. 5c) of the chemical container 74, the central plunger of the Schrader type valve contacts spring-loaded armature 228, opening taper seal 230 and through linkage 232, 234 opening taper seal 236 in outlet 238 of the chemical container, allowing breath to be blown through downwardly extending tube 240 and through the chemical solution 188. The reduction in pressure at this point causes spring loaded pins 206 and 208 (FIG. 5b) to release, and when the container is removed, preventing re-use.

B. THE DISCRIMINATOR SWITCH AND ONE-HOUR TIMER

Figures 6, 8, 9:
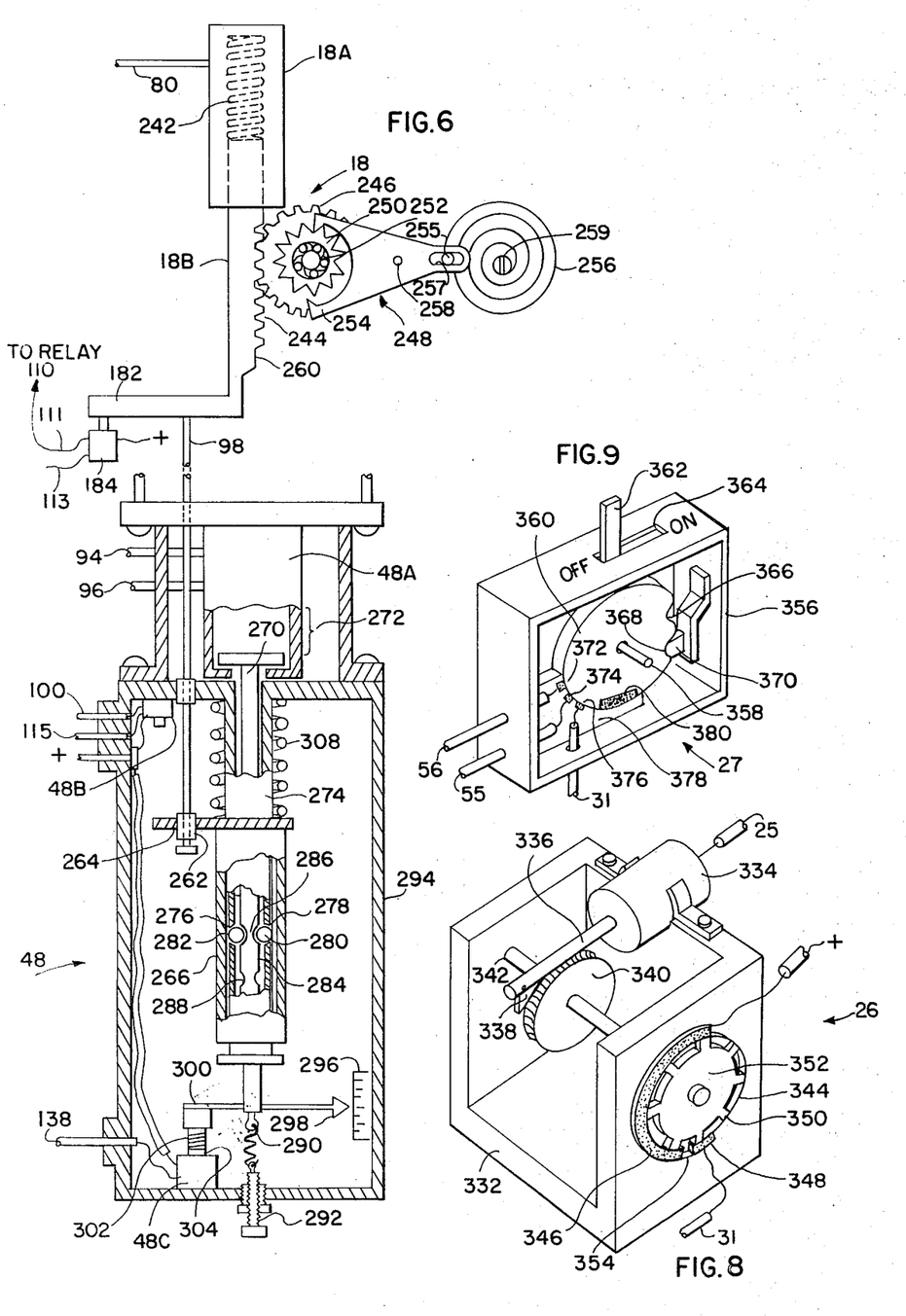
FIG. 6 is a diagrammatical elevation in partial section of a mechanism.
FIG. 8 is a perspective view of a special switch.
FIG. 9 is a perspective detail of a switch.

To recapitulate, one-hour timer 18 and discriminator switch 48 together arm delayed cut on/cut off switch 16 if the discriminator switch determines that this is proper and the delayed cut on/cut off switch 16, when armed, imposes a 15-second delay on the system and thereafter allows current to be supplied to the coil circuit disabler relay 22 and the metering valve 24, placing both in operating condition. The signals which are actuated at this time are the breath sample light 30, the bell 40, and the park light 34. To extinguish these signals and turn on the "drive" light 32, the following sequence and operation of the elements occurs:

FIG. 6 shows in elevation and partially in section, the one-hour timer assembly 18 mechanically connected by linkage 98 to the discriminator switch 48.

First, bellows switch 76 arms the one-hour timer 18 by supplying current through line 80 to solenoid 18a, which, in turn, raises timer shaft 18b, compressing spring 242 in the solenoid casing which urges the shaft down.

Shaft 18b has a rack 244 on one longitudinal face, and rack 244 engages a gear 246 which is connected to an escapement 248. The escapement is shown schematically as the gear 246 engaging the rack 244, cogwheel 250 mounted to gear 246 through over-running cluth 252, double pawl 254 engaging the cogwheel 250, and balance spring 256 connected with the pawl by follower 255 and slot 257 and urging it to pivot on pawl pivot 258, in the usual manner for escapements. Split pin 259 fixes the spring to the housing (not shown) of the mechanism.

Characteristically, by this means, one hour is required for linkage 98 to descend.

Raising foot 182 on the one-hour timer 18 when a breath sample is given releases the S.P.D.T. one-hour timer switch 184 which in turn through line 111 energizes the coil of relay 110 closing the contacts. These contacts pass current to the solenoid tipper 16b from switch 48b through line 100, 100' and 100'', and also through the contacts of NC relay 78 and NO relay 110. In addition, raising foot 182 allows the S.P.D.T. one-hour timer switch 184 to de-energize bell 40 through line 113 and breath sample light 30 through lines 113, 146, indicating that the demands of the system have been met. Switch 48b, also a S.P.D.T. switch, is thrown when pressed by extension 264 of sleeve 266 located in the discriminator switch 48. Pressing switch 48b de-energizes line 115 which is in parallel with line 113 and 146. Lowering foot 182 reverses the throw of one-hour timer switch 184 thereby de-energizing NO relay 110, opening the contacts and interrupting the current from switch 48b through lines 100, 100' and 100'' to solenoid tipper 16b. S.P.D.T. switch 184 has its points spaced and arranged to energize line 113, 146 1 minute before line 111 is de-energized when foot 182 moves downward ringing bell 40 and energizing breath sample light 30 1 minute before the fuel metering valve 24 is closed. This 1 minute warning alerts the vehicle operator so that he can comply with the demand being made before the operation of the vehicle is affected.

A slight built-in backlash in the one-hour timer linkage represented by flat 260 on rack 18b allows the linkage to drop a short distance through guide 262 on extension 264 of sleeve 266 for purposes which will be seen. This allows shaft 98 to drop slightly so that extension sleeve 264 can move downward away from switch 48b at any time after a breath sample is given should the analysis indicate "drunk".

Discrimination between "drunk" and "sober" amplified output voltages from photocell 84 on lines 94, 96, is made in the following manner.

A "strong" voltage, as when the subject is drunk will energize solenoid 48a sufficiently to raise shaft 270 to the top of travel space 272. This has the effect of dropping sleeve 266, releasing extension 264 from bearing on switch 48b. Releasing switch 48b de-energizes the solenoid tipper swith 16b, commencing a time delayed cut-off of the entire system by delayed cut on/cut off switch 16A, which may be a thermal delay type, a condenser-type or any other suitable time delay switch.

A "weak" voltage, as when the subject is sober and using fresh chemicals, will lift the shaft 270 midway of travel space 272, and effectively lock the sleeve 266 in the up-position for so long as the voltage level is maintained, regardless of how far the timer linkage descends through guide 262.

The subject can continue to give breath samples as demanded by the one-hour timer 18 periodically without disturbing this system for so long as he remains sober and the chemicals remain unexpired.

The mechanism by which sleeve 266 is locked in the up position includes frame-attached tube 274 which has paired, opposed holes 276 and 278 intermediate the length, and spheres 280 and 282 which are sized to pass partly through the holes 276 and 278.

In the position shown in FIG. 6 the sleeve is unlocked with respect to the shaft 270 and to frame-attached tube 274.

To lock the sleeve with respect to the frame-attached tube, voltage applied to solenoid 48a draws shaft 270 upward between upper annular notch 286 and lower notch 288. This forces the sphere 280 and 282 outwardly after sleeve 266 is lifted. Thus the lower end of sleeve 266 rests on spheres 280 and 282 in an upward, locked position.

To unlock the sleeve, it is necessary either (a) to interrupt current to the solenoid 48a, as when the system is turned off or the photocell lamp (82, FIG. 4) fails or some other system element fails, allowing sleeve 266 to drop; increase the current to the solenoid 48a, drawing lower annular notch 288 even with the spheres 280, 282 allowing the sleeve 266 to drop, as when a "drunk" signal is received or the chemicals expire.

The shaft 270 is urged downward by spring 290 which can be adjustably balanced by screw 292 in the case 294 of the discriminator switch 48.

Adjacent the lower end of the shaft 270 is a scale 296 opposite a pointer 298 on the shaft to provide accurate reference for calibration of spring tension versus solenoid voltage.

Fixed to the lower end of the shaft 270 is an arm 300 which through a spring 302 is arranged to depress the plunger 304 of S.P.S.T. normally closed switch 48c mounted on case 294. This switch is only released when arm 300 is raised by travel upward of the shaft 270 into the "drunk" position.

When switch 48c is released in this manner, the contacts close and through line 138 and relays 45 and 47 the switch energizes the horn and headlights, 48 and 46. Additionally, through line 152 it energizes chemical expired light 36.

In general reference to the entire one-hour timer and discriminator switch assembly 18, 48 it can be seen that the device can be mounted in any attitude with respect to gravity without affecting the operation. Contributing to this capacity is spring 308 which forces sleeve 266 to drop, even when the sleeve is not acted on by gravity.

The dropping of sleeve 266 reverses the throw of S.P.D.T. switch 48b thereby through lines 100, 100' and 100'' and through the points of relays 78 and 110, de-energizing solenoid tipper 16b. At this point it should be noted that the one-hour timer 18 lapse of time or the discriminator switch 48 through receiving an indicative out put from photocell 84 can de-energize the solenoid tipper 16b. In addition, it should also be noted that either the one-hour timer 18 or the discriminator switch 48 can energize the bell 40 and the breath sample light 30.

c. THE DELAYED CUT ON/CUT OFF SWITCH

Figures 7, 10B, 10C:
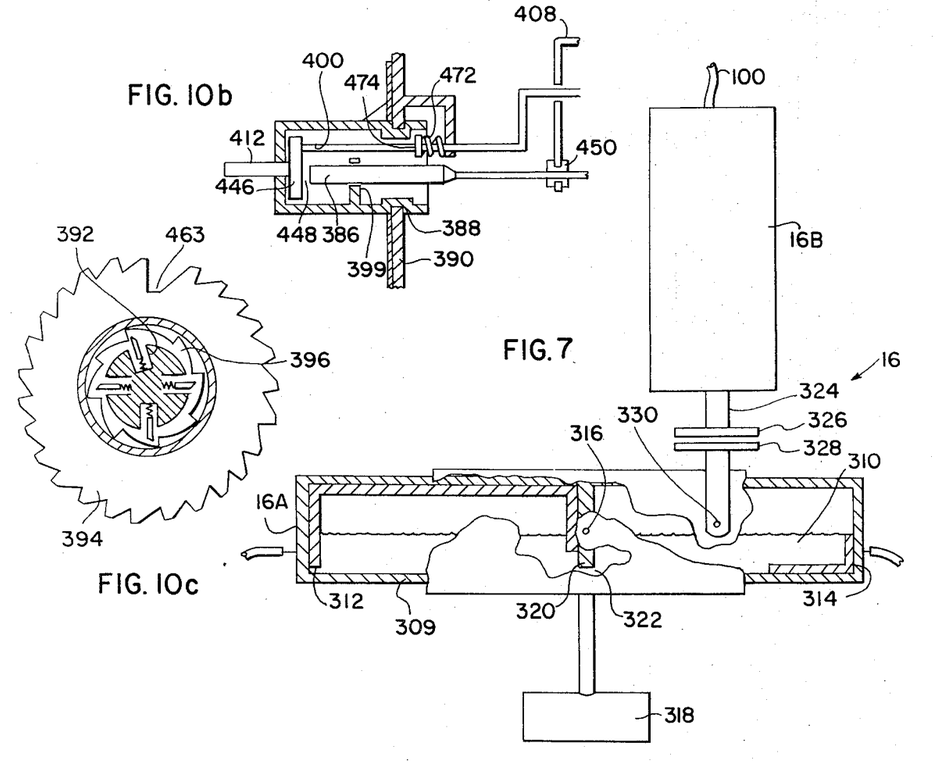
FIG. 7 is a side elevation, partly in section, of a mercury switch assembly.
FIG. 10b is a detail of FIG. 10a in section.
FIG. 10c is an elevation in partial section of a gear shown in FIG. 10a, but exaggerated for the sake of exposition.

FIG. 7 details the previously referred to time delay cut on/cut off switch 16, 16a which consists primarily of a pivoted hermetic container 309 having a quantity of liquid mercury 310 inside, a terminal 312 at the upper part of one end and a second terminal 314 at the lower part of the other end. The switch is pivoted at 316 and has a counterweight 318 below to maintain it in the horizontal position shown. Sufficient mercury is provided to short terminals 312 and 314 in the horizontal position. The quantity of mercury however, is made insufficient to short the terminals when the switch is tipped and all the mercury runs to the lower end. An interior wall 320 divides the switch into two halves. An aperture 322 allows the mercury to pass from one half to the other at a predetermined rate defining a three-minute delay in breaking the circuit when the switch is tipped and a 15 second delay in making contact when levelled again after breaking contact.

Solenoid 16b allows switch 16a to assume the level position when energized through lines 100, 100' and 100'' by the discriminating switch 48 on receipt of a "sober" indication, as noted. The armature 324 of the solenoid falls under gravity pressing self-aligning foot half 326 against the other half 328 which is pivoted at 330 to the hermetic container 309.

d. THE MANUAL AND DELAYED TOTAL CUT ON/CUT OFF SWITCHES

FIG. 8 shows details of the total cut on/cut off switch 26 which has two functions: (a) in conjunction with one-hour timer 18, and delayed cut on/cut off switch 16 which is responsive to the one hour timer, it will automatically turn off the entire system within 1 hour after the last breath sample is given if the driver leaves the vehicle and forgets to do so. This saves the battery and wear and tear on the system; (b) the switch 26 in conjunction with manual switch 27 and self-holding relay 54 with the lock-in circuit 56, 58 allows the driver to turn off the vehicle several times within one hour after the sample is given, without the necessity to give a fresh sample at each re-start.

The automatic turn-off feature is responsive to the previously described turning off of switch 16 through line 25 under control of discriminating switch 48 through lines 100, 100', 100'' and the one-hour timer 18. When the vehicle is on a slope, the switch 26 is prevented from turning off in spite of time lapse, as noted above, through provision of current by gravity switch or attitude switch 20, through the circuit 23, 132, 106, 102 and 25. The switch 26 will turn the system off only when it is denied current through line 25. The structure of the switch shown in FIG. 8 is as follows: insulative frame 332 supports solenoid 334 rigidly. The solenoid shaft or armature 336 has a pivoted tooth 338 arranged to rotate spur gear 340 which is pivotally mounted to the frame on insulative axle 342 to which it is fixed. Also fixed on insulative axle 342 is spoked switch member 344 which serves both for switching in cooperation with arc-shaped contacts 346 and 348 fixed in spaced relation in the frame.

When de-energized, the solenoid shaft 336 is extended as shown by an internal spring. When the solenoid is energized, the shaft retracts and the tooth 338 pivots, allowing the sloped side to drag over gear 340 without rotating the gear 340.

When the solenoid is again de-energized, the shaft 336 extends and the tooth 338 rotates gear 340 a fraction of a revolution, rotating spoked switch member 344.

The spokes 350 are conductive as well as the hub portions 352 joining the spokes. Gap 354 in the frame is wider than the spokes, so that when a spoke passes over the gap, the circuit from contact 346 to contact 348 is momentarily broken. Breaking this contact breaks the battery-to-line 31 circuit, and causes the points of relay 54 to break, dropping out the self-holding circuit. The spoke-to-spoke circuit is normally closed.

FIG. 9 shows the special manual cut-on switch provided to arm the self holding circuit comprising lines 55, 56 and 58, and relay 54, and by momentarily shorting of lines 56 and 55, and also on springback to a stable position to energize the whole system 10 by shorting line 55 to line 31. The mechanism is as follows: frame 356 mounts axle 358 which in turn pivotally mounts insulative cam 360. Cam handle 362 protruding through limiting slot 364 in the frame, provides means for the manual operation. Cam recesses 366 and 368 are positioned to engage spring-driven indexing locator 370. The contacts 372, 374 and 376 of lines 56, 55 and 31 respectively are secured by block 378 fixed to the frame 356. Cam shorting-contact 380 is ax-shaped and mounted in the cam periphery in position to close the circuits between the contacts as noted.

e. THE COMBINATION SWITCH

FIGS. 10a, 10b, 10c, 10d, 10e show in partial section, details of combination switch 12.

Figures 10A, 10D, 10E:
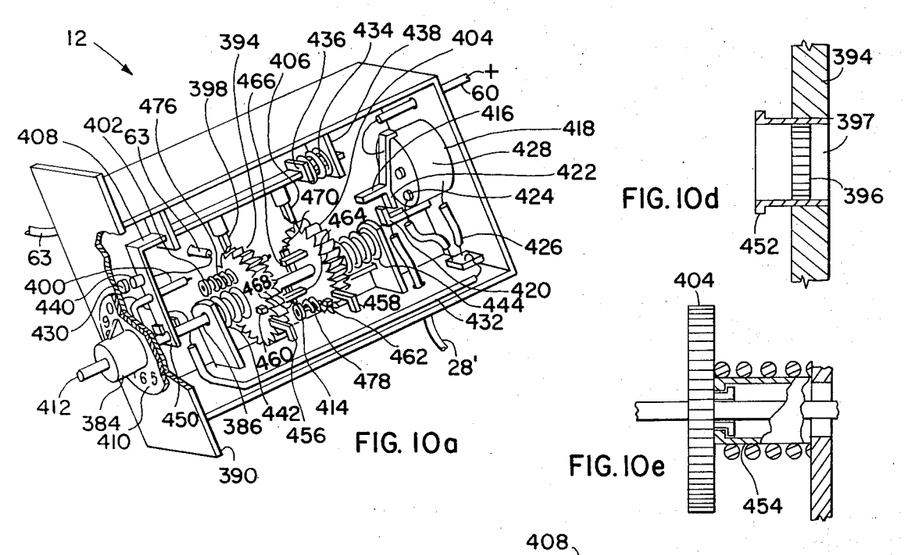

Input to the switch is a manual combination-setting of a dial 384 followed by pushing of a button 412.

Result of correct operation of the device 12 is to connect the incoming electrical supply line 60 through line 63 with the solenoid valve 42 of the breath sample cylinder 13 (see FIGS. 4 and 5a), and also to extinguish the combination needed light 28 by breaking the circuit through line 28'. A combination of only two numbers is shown, but it is to be understood that any desired additional numbers can be added by simply adding extra structures as shown.

To set the combination, dial knob 384 is turned to the left, turning square ended shaft 386 extended through a sleeve 399. FIG. 10b shows that the dial knob is rotatably secured by a groove 388 to the housing 390. Rotating knob 384 rotates shaft 386 which in turn rotates an integral ratchet connection 392, FIG. 10c inside gear 394 which is internally incline-toothed as at 396, FIGS. 10c and 10d, partially the length of the bore, turning the gear 394 to the left to the desired point of rotation, at which it is secured by external ratchet 398, FIG. 10a. The proper preset combination point is that at which plunger arm 400 lines-up with gear plunger 402, FIG. 10a. The same process is repeated in the opposite direction with gear 406 which is similarly but in the opposite direction ratcheted, by an internal ratchet, not shown, and external ratchet 404 which is secured to the same slidable member 408 as ratchet 398.

When both gear plungers 402 and 414 are coaxially aligned with plunger arm 400, the button 412 is depressed by the operator as far as it will go.

The first portion of the travel of the button 412 when it is pressed presses plunger arm 400 against gear plunger 402 which in turn depresses gear plunger 414, which then presses armature extension 416 of relay 418. This breaks the circuit between relay contacts 420 and 422, de-energizing the combination light circuit 28', and makes contact between relay contacts 422 and 424, causing the relay to lock-in through line 426 from the contact to the relay coil 428. Making the circuit through contacts 422 and 424 also energizes contact 430 on the housing 390 through line 432.

The final portion of the travel of button 412, frees the gears 394 and 404 to reset under the influence of torque springs 442 and 444 respectively in the following way. In the final portion of the travel of the button 412, offset 446, which is integrally affixed to the button 412, bridges gap 448 and pushes the end of shaft 386. This has two simultaneous effects, the first being to push slider 408 and the second is to push shaft 386. In the slider 408 a rotatable but not translatable joint 450 is located through which the shaft 386 extends so that when button 412 is depressed shaft 386 and slider 408 both move. Pushing the slider 408 carries external ratchets 398, 406 to the rear, clear of the teeth of gears 394 and 404 respectively, and the simultaneous push on the shaft 386 carries the internal ratchets free of the internal gearing which extends halfway through the gear bores as at 396, 397 FIG. 10d.

Both gear plungers 402, 414 have apertures in the ends so that the end of plunger arm 400 when depressed will insert into plunger 402 and the end of plunger 402 into plunger 414. The arrangement is such that ratchets 398, 406 are pushed clear of gears 394 and 404 before armature extension 416 is moved but the gears are held in position by the plunger arm 400 and gear plungers. The inner ratchet 392 is pushed clear of gear 396 and the gears are freely rotatable when button 412 is released, as best shown in FIG. 10d and 10e.

FIG. 10d shows typical outwardly flanged sleeve 452 which is press fitted to the gear. FIG. 10e shows the inwardly flanged journal assembly 454 which rotatably supports gear 404; a similar arrangement supports the other gear.

When the gears 394 and 404 are twisted back to the starting position by torque springs 442 and 444, stops 456 and 458 on the housing engage lugs 460 and 462 on the respective gears and define the zero or starting position. In addition the extended ratchet gears 398 and 406 are moved back into gears 394 and 404 at gap 463.

The dial knob 384 is reset to zero by lug 464 and 466 on the respective gears which on the return rotation engage arms 468 and 470 respectively, which are fixed to the shaft 386. FIG. 10b shows how the button 412 is returned to the outward or starting position by extension spring 472 which presses at one end against shaft enlargement 474 and at the other against the housing. Gear plungers 402 and 414 are returned to the outward or starting position by springs 476 and 478.

When the button 412 is released, the slider 408 is restored to the neutral position by spring 434 which bears on slider enlargement 436 and housing extension 438. Restoring the button to the outward position makes contact between slider contact 440 and housing supported contact 430 thus energizing line 63.

f. THE ATTITUDE SWITCH AND COIL CIRCUIT DISABLER RELAY SYSTEM

Figures 11A, 11B, 12, 13:
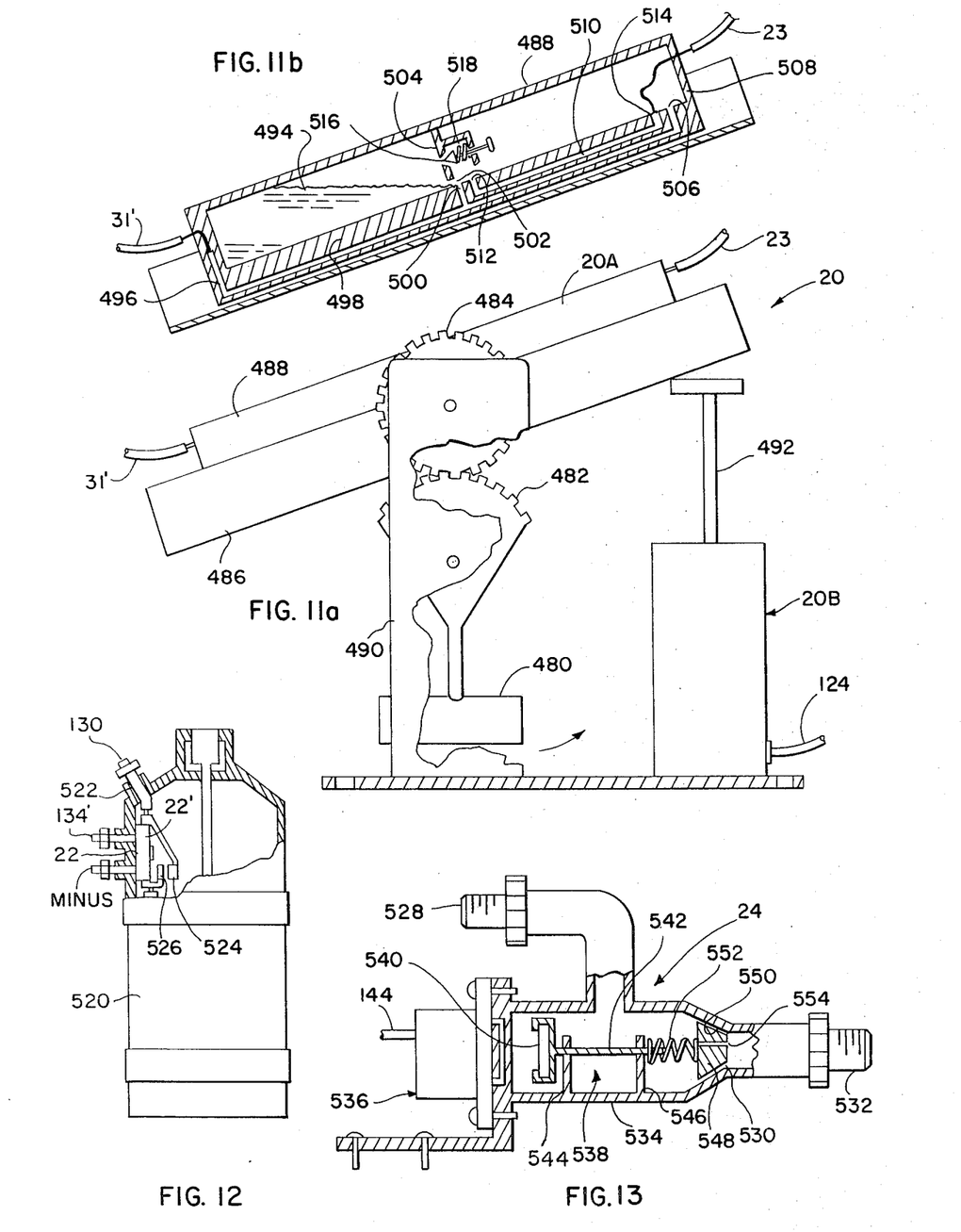

FIG. 11a is a side elevation of the "downhill" or gravitational attitude switch 20, which is a two-part assembly consisting of the attitude switch proper 20a and the solenoid assembly 20b for tipping the gravitational switch. As noted, the switch is adapted to bypass a circuit interruption at relay 52 caused by a "drunk" signal or a failure to give a breath sample, but if, and only if, the vehicle is oriented downhill, the purpose being to preserve the power-brake/power steering facilities of the vehicle until it reaches the bottom of a hill.

In operation, when the weight 480 swings to the side in the direction of the curved arrow in response to a downward incline in the road, it pivots gear 482 and complementary gear 484 and thus the cradle 486 and mercury switch body 488 which is attached to gear 484 through the cradle. Pivoting the mercury switch in this manner aligns it in a horizontal direction and the mercury makes and maintains contact between lines 31' and 23 until the attitude is again changed. Frame 490 supports the assembly and also, preferably, locates and supports solenoid tipper 20b in position for the armature 492, which is normally extended, to prop up the cradle 486 on the end breaking the mercury switch circuit between lines 31' and 23.

However, the solenoid tipper 20B is normally extended and prevents the weight from tipping the mercury switch 20A.

The purpose of having the solenoid tipper normally extended and breaking the mercury switch circuit between 31' and 23 is to insure that the mercury switch does not supply current through line 31' to line 23 and thus to N.C. relay 114, shutting metering valve 24 each time that a "downhill" position is assumed by the vehicle. Only after bypass line 106 has been energized should the metering valve 24 close.

The prime function of the downhill switch 20 then is to maintain the ignition when the vehicle is pointing downhill, by providing a shunting circuit through lines 23, 232, 118 and relay 116 and line 120 into the coil of N. O. relay 22, as noted previously.

An incidental function of the downhill switch is to maintain the metering valve 24 in the closed position by energizing N.C. relay 114 after line 106 ceases to supply current on lapse of the 3-minute cut off period.

To prevent such unwanted "nodding" of the mercury switch body 20a, then, the solenoid armature is normally in the extended position.

FIG. 11b shows the interior arrangement of the mercury switch body. This provides for faster flow of mercury 494 from left-to-right in the Figure than from right to left. The reason for allowing the bypass circuit through the mercury switch to be made quickly is simply to prevent engine cut-off when a grade is suddenly encountered in driving. The reason why the delay in breaking this bypass circuit is provided is to be sure the vehicle-system power brakes and steering are available for enough time after the vehicle reaches a level at the foot of an incline to allow bringing it to a stop. This delay is the 3-minute delay described earlier in reference to FIG. 3

The interior arrangement of the mercury switch 20a includes the mercury 494 which is contained in the divided body 488 of the switch, a first electrode 496 connecting with line 31' and running the length of the body 488 along the lower portion within the lower wall 498. A contact area 500 of the first electrode 496 is exposed at aperture 502 in the lower part of the central wall 504 of the switch; a second contact area 506 is exposed at the lower part of the far end 508 of the switch.

A second electrode 510 connecting with line 23 has two exposed areas 512 and 514, also in the lower wall 498 of the switch, one of the contact areas being near each of the two contact areas of the first electrode.

The central wall 504 has a check valve 516 which has a spring 518 loading it closed to mercury flowing from left-to-right, i.e., mercury flowing when the switch is brought toward level when such is allowed by the solenoid tipper 20B, FIG. 11a. The check valve spring is weak relative to the weight of mercury which flows against it when the switch is levelled, and provides a quick means for mercury to flow to the right, bypassing the small aperture 502 at the center wall 504. When urged from the opposite direction by the mercury (from right to left) the check valve closes, leaving only the much smaller aperture 502 for passage of the mercury, so that the 3-minute time to break contact is achieved.

The right hand contacts 506 and 514 are provided to prevent unwanted circuit interruption in the switch 20A when the vehicle is descending extremely steep gradients causing the mercury to leave the vicinity of the normally operative center contacts 500 and 512 and to pool at the right-hand end of the device.

To prevent a drunk operator from restarting the vehicle even for a short downhill run, after he has stopped in a downhill attitude and shut off the ignition, the coil of N.O. relay 122, FIG. 4, is wired in parallel with the normally cold side of the vhicle ignition switch as indicated by the legend at line 130 in FIG. 4. When ignition switch is opened, the selfholding circuit 31', 23, 126, 124 is broken by the normal extension of the solenoid 20B. Solenoid retraction cannot again be made to occur until current is again supplied to lines 124 and 126 through line 106 following an orderly re-test procedure. A thermo switch can be used instead of switch 20, if so desired.

FIG. 12 shows the relation of the special N.O. relay 22 to an ordinary high tension ignition coil 520 of the type supplied with vehicles. High tension coil 520 is shown partially broken away to reveal relay 22, the relay coil 22' of which is made to be responsive through line 134' to the AC oscillatortransformer circuit 104, 156, 158, FIG. 4. The low tension circuit of the vehicle passes to the high tension coil 520 from the vehicle ignition switch 38, line 130, casing fitting 522 and the contacts 524 and 526 of the special relay 22.

g. THE FUEL METERING VALVE

FIG. 13 shows the fuel metering valve 24 in partial section. Fuel enters the valve body at fuel fitting 528, passes through the throat 530 of the valve, and exits through fuel fitting 532.

The fuel metering valve includes a non-ferrous casing 534 having a solenoid 536 at one end, a plunger 538 made responsive to the solenoid by provision of a ferrous slug 540 mounted on a slider rod 542 held in two perforated brackets 544 and 546. A conical valve armature 548 mounted on the end of the slider opposite the slug is arranged to close against a conical seat 550 in the body. A compression spring 552 installed between bracket 546 and the valve armature 548 normally forces the valve to the closed position. A bypass orifice 554 through the armature allows sufficient fuel to pass to preserve vehicle idling in the closed position. The valve opens in response to actuation of solenoid 536. Solenoid 536 opens when line 144 is energized during normal operation. The circuit is broken and the valve closes when line 106 is energized opening the normally closed points of relay 114.

What is claimed and desired to be secured by United States Letters Patent is:

1. In a system for detecting the presence or absence of a foreign substance in the physiology of a vehicle operator, and for regulating operation of a vehicle by said operator accordingly, the improvement comprising: means for testing said an operator prior to operation of the device; means for displaying the result of said testing to said an operator; means for preventing operation of the device following a first type test result and for enabling operation of the device following a second type test result; means for requiring periodic retest of said an operator during operation of the device, and means for progressively impairing operation of the device following a first type retest result and for permitting continued operation of the device following a second type retest result.

2. In a system as recited in claim 1, wherein the device comprises a motor vehicle having an ignition system and a fuel system, wherein the means for testing the operator prior to operation of the device comprises a breath testing means including means for taking a breath sample; means for analysing the breath sample and for yielding a test result, pursuant to the analysis, and means for discriminating between the first type test result and the second type test result.

3. In a system as recited in claim 2, wherein the means for preventing operation of the motor vehicle following a first type test result includes means for preventing operation of the ignition system of the motor vehicle.

4. In a system as recited in claim 3, wherein the means for requiring periodic retest comprises: means for periodically signalling to said an operator a requirement for retest of said an operator and means responsive to the means for periodically signalling, for actuating said means for progressively impairing operation on failure of said an operator to retest on receipt of a periodic signal.

5. In a system as recited in claim 4, wherein the means for progressively impairing operation comprises means for reducing flow of fuel in said fuel system to a pre-set minimal amount.

6. In a system as recited in claim 5, wherein means is provided for establishing a pre-set interval beginning with the time of said reducing of the fuel flow, and means for interrupting operation of said ignition system of the motor vehicle after said pre-set interval.

7. In a system as recited in claim 6, and means for suspending said interruption of operation of the ignition system of the motor vehicle during downhill travel of the motor vehicle.

8. In a system as recited in claim 2, wherein the means for testing additionally comprises means for mentally testing said an operator prior to said breath testing, including combination switching means, means for preliminarily signalling said an operator to enter a predetermined combination in said combination switching means, and means for enabling operation of the breath testing means on entry of the predetermined combination in the combination switching means.

9. In a system as recited in claim 2, wherein the means for taking a breath sample comprises the following units: a mouthpiece, a check valve, a first tube, means for storing the first tube, an expansible chamber, a solenoid valve, a tank; breath conductive means for connecting all said units in series, means responsive to the means for storing the tube for closing the solenoid valve when the tube is unstored, thereby permitting a said breath sample when taken to expand the expansible chamber, and means for opening the solenoid valve when the tube is stored for thereby permitting a said breath sample in the expansible chamber to pass through the solenoid valve to the tank.

10. In a system as recited in claim 9, additionally, means responsive to said breath conductive means for preventing closure of the solenoid valve when the breath conductive means is removed from the chemical tank.

11. In a system as recited in claim 10, wherein the means for analysing the breath sample comprises: means for transmitting light through the tank, means for altering transmissivity of light through the tank in response to presence of said foreign substance in said a breath sample conducted to the tank through the breath conductive means, and wherein the means for yielding a test result comprises means for electrically indicating degree of transmissivity of light through the tank, said means for discriminating being means for electrically discriminating between a first and a second degree of said electrical indication for thereby indicating respectively said first type test result and said second type test result.

12. In a system as recited in claim 11, wherein the vehicle has accessories and wherein the means for displaying the results comprise: a bell, first lighting means, second lighting means, means for controlling vehicle accessories and means responsively connecting the means for discriminating for actuation of all said first and second light means and means for controlling.

13. In a system as recited in claim 11, wherein the means for transmitting comprises a light source positioned for illuminating at least a portion of the tank, wherein the means for altering transmissivity comprises a solution of chemicals within the tank, wherein the means for electrically indicating degree of transmissivity comprises a photoelectric detector, and means for responsively connecting the photoelectric detector with said means for discriminating.

14. In a system as recited in claim 13, wherein the means for discriminating comprises a voltage sensitive switch, a timing mechanism, and means operatively connecting the voltage sensitive switch and the timing mechanism.

15. In a system as recited in claim 14, wherein the voltage sensitive switch comprises a vertically arranged first solenoid having a frame and armature with a shaft affixed to the armature, said first solenoid comprising a portion of the means for periodically signalling, inner and outer sleeves deployed coaxially around the first solenoid shaft, the inner sleeve fixed with respect to the frame of the solenoid, the first solenoid shaft having upper and lower recesses spaced along the length thereof, the inner sleeve having at least one aperture through the wall thereof, a circular member retained by the aperture; the diameter of the circulat member being such that together with the radial dimensions of the first solenoid shaft and outer sleeve, the outer sleeve moves freely in a longitudinal direction with the circular member positioned in a recess in the first solenoid shaft but is restrained from moving with the circular member positioned at a point on the first solenoid shaft outside a recess, the lower said recess being located to receive the circular member at the lowest point of motion of the first solenoid shaft and the higher said recess being located to receive the circular member at the highest point of motion of the first solenoid shaft.

16. In a system as recited in claim 16, wherein the timing mechanism includes a second solenoid having a shaft affixed to the second solenoid armature and slidably connective with said outer sleeve and the means on the end thereof for constraining the downward motion of the outer sleeve, means for lowering the second solenoid armature shaft proportionally to passage of time, and means for actuating the second solenoid for raising all said second solenoid shaft and outer sleeve.

17. In a system as recited in claim 16, wherein the voltage sensitive switch includes: first switching means positioned for actuation by motion of the first solenoid shaft in the upper range of said motion, second switching means positioned for actuation by motion of the outer sleeve at the upper end of said motion, and third switching means positioned for actuation by downward motion of the second solenoid shaft at the lower end of said motion.

18. In a system as recited in claim 17, wherein the means for actuating the second solenoid for raising all said second solenoid shaft and outer sleeve comprises a switch positioned for actuation on expansion of said expansible chamber when a breath sample is given, and a line for supplying power through said expansible chamber operated switch to the second solenoid on expansion of the expandible chamber.

19. In a system as recited in claim 18, wherein the means for responsively connecting the photoelectric detector with the means for discriminating comprises an amplifier and a lead connecting the amplifier with the first solenoid, wherein a said second type test result includes a signal of relatively low voltage raising the first solenoid armature and shaft a distance positioning the upper said recess on the first solenoid shaft above the circular member and the lower said recess below the circular member, thereby restraining the outer sleeve from lowering with second solenoid shaft on passage of time, and wherein a first type test result includes a signal of relatively higher voltage placing the lower recess in the first solenoid shaft opposite the circular member, allowing the outer sleeve to lower.

20. In a system as recited in claim 19, wherein said vehicle accessories include horn and headlights, wherein means are provided operatively connecting the first switching means with the horn and headlights for energization thereof on actuation of the first switching means by raising of the first solenoid shaft to the top of travel thereof, wherein a circuit including operable means is provided for connecting the second switching means for energization of the means for progressively impairing operation of the vehicle on actuation of the second switching means by lowering of the outer sleeve; and wherein means are provided for operating said operable means for connecting the second switching means with the means for progressively impairing operation of the vehicle, on lowering of the second solenoid shaft.

21. In a system as recited in claim 20, wherein means are provided for operatively connecting the first switching means with the first lighting means for thereby indicating a use condition of said solution of chemicals, and wherein means are provided for operatively connecting the second and third switching means with the bell and with the second lighting means for thereby signalling by sounding a warning and indicating that a further breath sample is needed for operation of the vehicle.

22. In a system as recited in claim 21, wherein the means responsive to the means for periodically signalling for actuating said means for progressively impairing operation, comprises a time switch actuating means, wherein a time switch is provided with means in said time switch for delaying switching in response to said actuation, wherein a fuel valve having a full opening therein and a bypass opening which is small relative to the full opening is provided, and a circuit connecting the time switch for closing the full opening in said fuel valve.

23. In a system as recited in claim 22, the means for preventing operation including a first circuit; the means for suspending interruption of operation including a second circuit operable for paralleling the first circuit, including attitude responsive means for operating the second circuit to parallel the first circuit.

24. In a system as recited in claim 7, the means for suspending interruption of operation of the ignition system of the motor vehicle during downhill travel comprising attitude sensitive means and means for switching responsively connected with the attitude sensitive means.

25. In a system as recited in claim 24, means for preventing the attitude responsive means from operating the second circuit prior to expiration of said pre-set interval following the reduction of fuel flow.

26. In a system as recited in claim 2, wherein the vehicle ignition system includes an ignition coil, a relay in the ignition coil housing having a pair of contacts serially connective in the coil circuit and a relay coil circuit, and means making said relay coil circuit operable solely at electric voltage and frequency other than the electric voltage and frequency required for operation of said ignition coil of the vehicle.

* * * * *